(12) United States Patent
Edwards et al.

(10) Patent No.: US 10,478,996 B1
(45) Date of Patent: Nov. 19, 2019

(54) METHOD OF MAKING CERAMIC COMPOSITE BEARINGS

(71) Applicant: Lancer Systems L.P., Quakertown, PA (US)

(72) Inventors: Timothy J. Edwards, Schwenksville, PA (US); Terry A. Herb, Harleysville, PA (US); Joseph Braza, Doylestown, PA (US); Robert D. Cook, Jr., Collegeville, PA (US); Kyle A. Miller, Downingtown, PA (US); Lukas P. Millard, Red Hill, PA (US); Christopher Corrado, Hatfield, PA (US)

(73) Assignee: Lancer Systems L.P., Quakertown, PA (US)

( * ) Notice: Subject to any disclaimer, the term of this patent is extended or adjusted under 35 U.S.C. 154(b) by 305 days.

(21) Appl. No.: 15/395,658

(22) Filed: Dec. 30, 2016

Related U.S. Application Data

(60) Provisional application No. 62/272,808, filed on Dec. 30, 2015.

(51) Int. Cl.
*B28B 21/94* (2006.01)
*C04B 35/80* (2006.01)
(Continued)

(52) U.S. Cl.
CPC .............. *B28B 21/94* (2013.01); *B28B 21/18* (2013.01); *B28B 21/20* (2013.01); *B28B 21/205* (2013.01); *B28B 21/42* (2013.01); *B28B 21/50* (2013.01); *B28B 21/72* (2013.01); *B28B 21/88* (2013.01); *C04B 35/52* (2013.01);
(Continued)

(58) Field of Classification Search
CPC .......... B28B 21/94; B28B 21/72; B28B 21/42; C04B 41/82–41/84; C04B 2235/616
See application file for complete search history.

(56) References Cited

U.S. PATENT DOCUMENTS 2,011,463 A * 8/1935 Vianini ............... B28B 19/0038
138/176
2,377,608 A * 6/1945 Bronson ................. B28B 21/94
138/145
(Continued)

FOREIGN PATENT DOCUMENTS

FR 1093457 A * 5/1955 ............. B28B 21/72
GB 262046 A * 5/1927 ............. B28B 21/72
GB 2091157 A * 7/1982 ............... B28B 1/52

*Primary Examiner* — Erin Snelting
(74) *Attorney, Agent, or Firm* — Design IP

(57) ABSTRACT

A method for forming a ceramic matrix composite bearing includes preparing a layup slurry from a mixture of water, pre-ceramic polymer and refractory filler. The method further includes forming a concentric stack of slurry-impregnated fabric sleeve layers over a rod-shaped inner mold and applying an outer mold to form a mold assembly. The method also includes heating the mold assembly to form a tubular green body and rough cutting the green body to bearing length. In addition, the method includes heat-treating the bearing and performing a polymer infiltration and pyrolysis treatment. The method further includes conducting dimensional stability treatment processes on the bearing and final grinding and machining to meet pre-determined specifications.

20 Claims, 13 Drawing Sheets

(51) Int. Cl.
*C04B 35/626* (2006.01)
*B28B 21/50* (2006.01)
*B28B 21/18* (2006.01)
*B28B 21/42* (2006.01)
*B28B 21/72* (2006.01)
*B28B 21/88* (2006.01)
*B28B 21/20* (2006.01)
*C04B 35/52* (2006.01)

(52) U.S. Cl.
CPC .......... *C04B 35/6261* (2013.01); *C04B 35/80* (2013.01); *C04B 2235/386* (2013.01); *C04B 2235/483* (2013.01); *C04B 2235/6028* (2013.01); *C04B 2235/616* (2013.01)

(56) References Cited

U.S. PATENT DOCUMENTS

| | | | | |
|---|---|---|---|---|
| 3,107,158 A | * | 10/1963 | Ahlberg | B28B 21/60 264/228 |
| 4,526,208 A | * | 7/1985 | Klimpl | B28B 11/14 138/144 |
| 5,687,787 A | * | 11/1997 | Atmur | C04B 35/6267 264/629 |
| 5,939,216 A | * | 8/1999 | Kameda | C04B 35/08 428/323 |
| 6,641,693 B2 | * | 11/2003 | Guckert | B29C 53/60 156/169 |
| 8,298,664 B2 | * | 10/2012 | Jia | A61C 13/0003 428/357 |
| 2002/0109250 A1 | * | 8/2002 | Kim | C04B 41/5059 264/29.7 |
| 2003/0157285 A1 | * | 8/2003 | Busshoff | B29C 63/20 428/36.4 |
| 2006/0147622 A1 | * | 7/2006 | Gray | C04B 35/573 427/180 |
| 2009/0211517 A1 | * | 8/2009 | Kato | C30B 15/10 117/200 |
| 2012/0034415 A1 | * | 2/2012 | Kato | B32B 18/00 428/114 |
| 2014/0084521 A1 | * | 3/2014 | Sauder | B28B 7/342 264/640 |
| 2017/0001373 A1 | * | 1/2017 | La Forest | B28B 1/001 |

* cited by examiner

METHOD OF MAKING CERAMIC COMPOSITE BEARINGS

The present disclosure relates, in general, to bearings, such as sleeve bearings, and more particularly, to ceramic composite sleeve bearings. In particular, the present disclosure related to methods for making ceramic composite bearings having high structural strength and superior resistance to deformation and wear while being relatively lightweight in comparison with conventional bearings.

BACKGROUND

Conventional bearings that are utilized, for example, to provide relative rotational movement between two or more objects, are typically fabricated from materials having properties suitable to withstand stresses imposed on the bearing in a desired application. Materials exhibiting high hardness and/or toughness are conventionally used to fabricate bearings including steel, steel alloys and monolithic ceramic materials. However, the inventors have observed that in applications where components of the bearings are exposed to increased stresses (e.g., high contact stresses), for example, when used in rotational equipment (such as pumps and compressors), as well as in aircraft or aerospace applications, bearings made from conventional materials display unacceptable amounts of deformation and/or degradation, thereby resulting in rapid or premature failure modes for the bearing.

High-strength and high-performance conventional bearings are also known, which are bearings that are made from high density or high performance versions of the same materials, which can provide increased strength for resisting deformation and can increase the useful life of the bearings. However, these high-performance/high-strength versions have increased weight and increased costs compared with bearings made from standard materials. Thus, conventional bearings made from enhanced strength or wear resistant materials fail to provide a good solution for overcoming the weaknesses of standard conventional bearings.

Conventional bearings have also been formed from monolithic ceramic, ceramic composite or hybrid ceramic materials. Such bearings use technical, specialized or advanced ceramics materials that are specially tailored for their uses, such as to be biocompatible or food compatible for biological or food processing uses, to be non-magnetic or non-conductive for electronics uses, or to have certain chemical or physical properties. For instance, materials for these conventional bearings are tailored to provide high heat resistance or corrosion resistance for some applications, and can be configured to have high flexural strength and durability.

These conventional monolithic specialty-material bearings are highly configurable and can provide a wide range of diverse properties that are appropriate for various applications and uses. However, they are formed from uniform, monolithic configurations of these specialty materials and lack structural reinforcements such as reinforcing fibers, fabrics or integrated support features. As such, these conventional monolithic specialty-material bearings nonetheless fail to overcome the weaknesses of other conventional bearings with respect to structural strength, deformation resistance and durability.

Accordingly, there remains a need for improved bearings having enhanced structural integrity and high resistance to deformation, thermal shocks and fractures—especially in comparison with monolithic ceramic-type bearings. Further, there remains a need for relatively lightweight bearings and bearings that can provide such benefits without significantly increasing the weight of the bearings.

BRIEF DESCRIPTION OF DRAWINGS

Embodiments of the present invention discussed in greater detail below, can be understood by reference to the illustrative embodiments of the invention depicted in the appended drawings. It is to be noted, however, that the appended drawings illustrate only typical embodiments of the invention and are therefore not to be considered limiting in scope, for the invention may admit to other equally effective embodiments.

SUMMARY OF THE DRAWINGS

Figure 1:
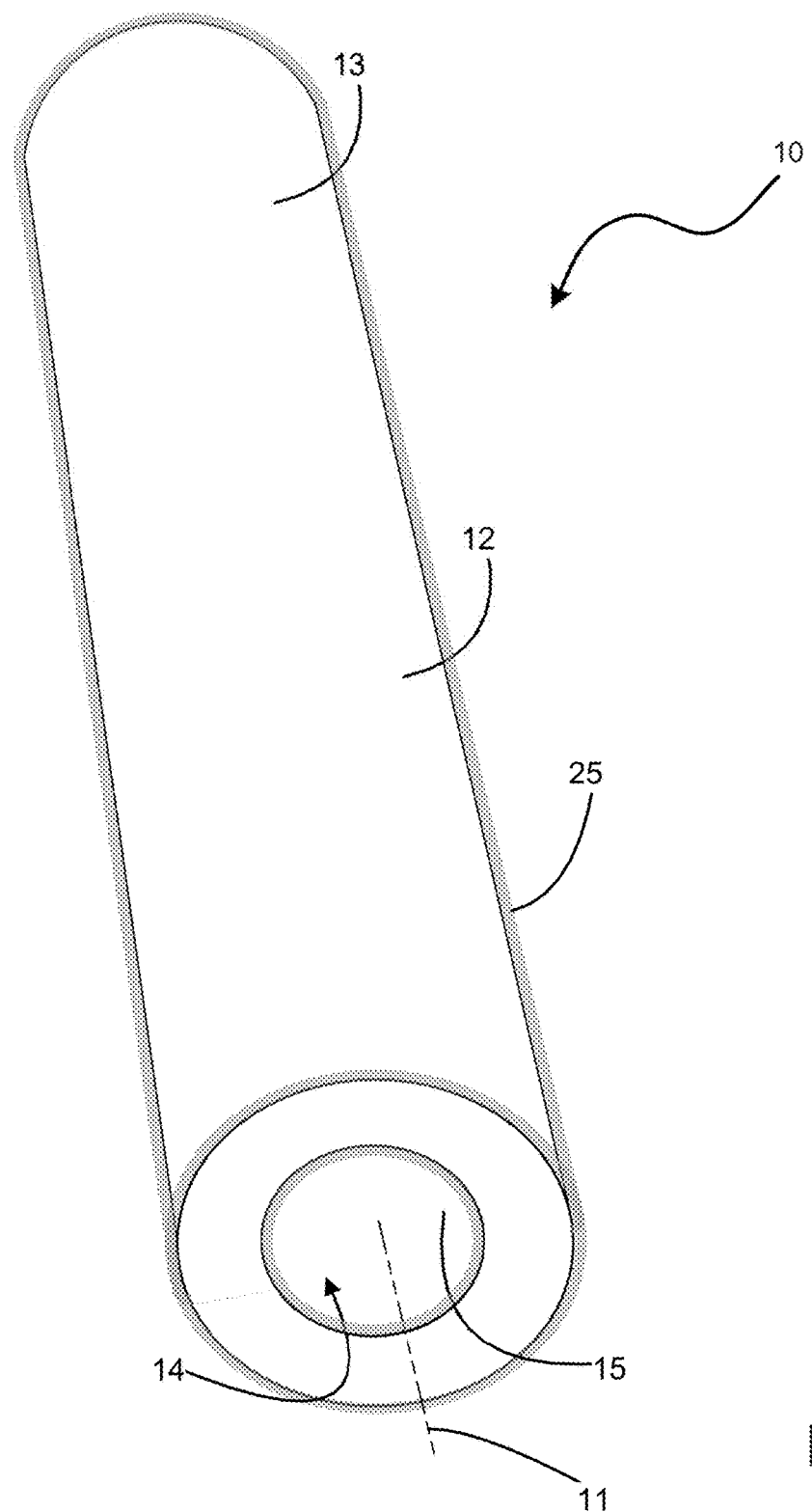
FIG. 1 is a perspective view of an exemplary ceramic matrix composite bearing.

Aspects and features are described herein of methods for forming a ceramic matrix composite bearing, which are described along with the accompanying illustrations and figures that are intended to show, demonstrate or represent various features and aspects through the use of exemplary arrangements, configurations and processes shown in the drawings. It is understood that aspects and features of the invention are not limited to the particular examples shown in the drawings and/or described herein.

According to one aspect of the invention, a method for forming a ceramic matrix composite bearing can include preparing a layup slurry formed from a mixture including water, a pre-ceramic polymer and a refractory filler, in which a ratio of the pre-ceramic fiber to the refractory filler is 20% to 50% by weight, and also forming a concentric stack of fabric sleeve layers over a rod-shaped inner mold that are each impregnated and coated with the layup slurry. The method can further include applying an outer mold that, when assembled, forms an inner perimeter in the shape of a tubular cylinder that extends around the concentric stack and the inner mold to form a mold assembly, and heating the mold assembly to bond together and cure the stack of concentric slurry-impregnated fabric sleeve layers to form a tubular green body therefrom.

Also, the method can include rough cutting the green body to a pre-determined bearing length to form an elongate green bearing, and rough treating the green bearing including iteratively performing a density-tuning process for one or more cycles until a density of the green bearing meets a pre-determined density parameter. The density-tuning process can include performing, in order, the steps of heat-treating the green bearing in a kiln, and performing a polymer infiltration and pyrolysis (PIP) treatment on the green bearing, as well as conducting dimensional stability treatment processes on the green bearing, and performing final grinding and machining of the green bearing to meet pre-determined specifications.

According to another aspect, the step of preparing the layup slurry of the method can include roll-milling and cutting the slurry mixture through a roll mill machine having a plurality of feed rollers spaced apart at a pre-selected feed spacing and a plurality of exit rollers spaced apart at a pre-selected exit spacing.

According to yet an additional aspect, for the method step of roll-milling, the plurality of feed rollers can include at least three feed rollers, the plurality of exit rollers can include at least three exit rollers, the pre-selected feed spacing is from 0.008 to 0.011 inches (0.203 to 0.279 mm), and the pre-selected exit spacing is from 0.005 to 0.007 inches (0.127 to 0.178 mm). Also, for another aspect, the method step of performing secondary roll-milling, the one or more repeat cycles can include iteratively performing secondary roll-milling for one to seven repeat cycles after the step of roll-milling the slurry mixture through the roll mill machine, so that the slurry mixture is roll-milled through the roll mill machine 2 to 8 times.

For yet another aspect, the method step of preparing a layup slurry can further include, after completion of the repeat cycles, mixing the secondary cut rolled exit mixture for a vacuum mixing period within a vacuum mixing machine while pressure within the vacuum mixing machine is reduced by a pre-determined pressure reduction to form the layup slurry. According to an additional aspect, for the method step of mixing the secondary cut rolled exit mixture for the vacuum mixing period within the vacuum-mixing machine, the vacuum mixing period is from 12 to 24 hours and the pre-determined pressure reduction is a reduction of between $1\times10^{-2}$ to $1\times10^{-5}$ Torr.

In accordance with another aspect, the method step of forming the concentric stack of slurry-impregnated fabric sleeve layers over the rod-shaped inner mold can include providing a plurality of tubular-shaped fabric sleeves formed from a fiber fabric. Each one of the fabric sleeves is formed into a tube having a continuous wall perimeter formed into an elongate loop and forming a pair of openings at opposite ends of the loop, coating an outer surface of the inner mold with a first portion of the layup slurry, and concentrically stacking and slurry-impregnating the plurality of fabric sleeves including repeating, in order, a stacking cycle to concentrically add each of the plurality of fabric sleeves to the concentric stack until a pre-determined stack configuration has been achieved. The stacking cycle can include positioning one of the plurality of fabric sleeves longitudinally over the coated inner mold and the stack of installed concentric slurry-impregnated fabric sleeve layers disposed thereon, if any, and impregnating and coating the one of the plurality of fabric sleeves with a second portion of the layup slurry. For the steps of forming the concentric stack and providing the plurality of fabric sleeves, the fiber fabric can include a woven fiber fabric selected from the group consisting of ceramic fiber fabric, glass fiber fabric, quartz fiber fabric, and alumina fiber fabric.

In accordance with yet an additional aspect, the method can further include, immediately prior to performing the step of coating the outer surface of the inner mold, mixing into the layup slurry a pre-determined ratio of a catalyst. The pre-determined ratio is based on the weight of the pre-ceramic polymer previously mixed into the layup slurry, and the pre-determined ratio of the catalyst can be a ratio from about 1% to 5% by weight of the catalyst to the pre-ceramic polymer previously mixed into the layup slurry. Further, the catalyst can include a platinum-modified polycarbosiloxane. In addition, the catalyst can include a methyl vinyl cyclic (MVC) addition-curable silicone known as ANDISIL MVC combined at a ratio of 10% addition catalyst and 90% ANDISIL MVC.

According to another aspect, for the method step of forming the concentric stack, the sub-step of impregnating and coating the plurality of fabric sleeves with the second portion of the layup slurry can additionally include coating side portions of the plurality of fabric sleeves with the second portion of the layup slurry, and ensuring a coating of layup slurry extends from each of the side portions to a corresponding side of the inner mold. In addition, the sub-step of providing the plurality of fabric sleeves can include performing one or more preparation processes on the fabric sleeves that can include heat cleaning, firing with binders configured to provide miscibility with polymers, and interfacing with boron nitride. Further, the one or more preparation processes on the fabric sleeves can include graphitization processing.

In accordance with yet an additional aspect, for the method step of forming the concentric stack, the rod-shaped inner mold can be formed from an outwardly expandable andcollapsible rod-shaped inner mold, the step of forming the concentric stack of slurry-impregnated fabric sleeve layers over the rod-shaped inner mold can include outwardly expanding the rod-shaped inner mold. The method can further include, after heating the mold assembly to bond together and cure the concentric stack, performing the step of disassembling the mold assembly that can include removing the outer mold, collapsing the rod-shaped inner mold, and withdrawing the collapsed inner mold from a central portion of the green body. In addition, the rod-shaped inner mold can be formed from a rod-shaped inner mold configuration that can include a tubular pipe expander configured to selectively expand and collapse the rod-shaped inner tube, an inflatable silicon bladder pulled over a metal tube and configured to expand when inflated and collapsing when not inflated, and/or a pair of mating rod halves that each include a contact surface opposed to the contact surface of the other mating rod half and extending parallel with a longitudinal axis of the rod-shape inner mold and forming an interface therebetween, a high temperature-capable consumable material being installed and removed between the pair of the mating rod halves in the interface to expand and collapse the rod-shaped inner mold.

According to an additional aspect, the green bearing can be rough machined to within 0.1 inches of the final dimensions of the bearing prior to being heat treated. According to yet another aspect, for the method step of rough treating the green bearing, the sub-step of performing the PIP treatment on the green bearing can include placing the heat-treated green bearing in a vacuum chamber, reducing pressure within the vacuum chamber by a pre-determined PIP pressure reduction level, maintaining the pre-determined PIP pressure reduction level in the vacuum chamber for a pre-determined PIP vacuum period ranging from 1 to 3 hours, applying a polymer to the heat-treated green bearing to submerge the green bearing in the polymer while within the PIP vacuum chamber at the pre-determined PIP pressure reduction level, maintaining the heat-treated green bearing submerged in the polymer while at the pre-determined PIP reduced pressure for a pre-determined polymer submersion period ranging from 1 to 2 hours, after the pre-determined polymer submersion period, returning the PIP chamber to an ambient pressure level, and removing the heat-treated green bearing from the PIP vacuum chamber.

For an additional aspect, the method step of conducting dimensional stability treatment processes on the green bearing can include submerging the heat treated green bearing in a water bath that has been pre-heated to at least 80 degrees C. and under an elevated pressure of at least 172 kPa (25 PSI) for a pre-determined stability treatment period, and the stability treatment period can be a period of at least 12 hours.

These and other various aspects, preferences and features of methods discussed herein for forming ceramic composite bearings can provide relatively lightweight bearings having exceptional properties and characteristics in comparison with conventional bearings, including in comparison with conventional bearings formed from monolith ceramic materials and specialty materials. The resulting ceramic composite bearings can have very high strength characteristics and can exhibit extraordinary resistance to deformation, wear and fracture during use without increasing the weight of the bearings versus conventional bearings.

DETAILED DESCRIPTION OF THE DRAWINGS

The following detailed description refers to the accompanying drawings. The same reference numbers in different drawings may identify the same or similar elements. The following detailed description does not limit the invention nor is the invention limited only to the example illustrations and figures shown in the drawings.

To aid in describing the invention, directional terms may be used in the specification and claims to describe portions of the present invention e.g., upper, lower, left, right, etc., which generally applies to the ceramic matrix composite bearing and/or its components when oriented in their typical usage configuration, as well as to a method or steps of the method for forming a ceramic matrix composite bearing when the bearing and/or its components or items used as part of the method or process steps are oriented in their typical usage configuration, such as vacuum chambers, mixing devices and/or rolling equipment arranged with their respective base placed on the floor. These directional definitions are merely intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

Ranges disclosed herein are inclusive and combinable (e.g., ranges of "a temperature of about 345 degrees to 360 degrees Fahrenheit (174 degrees to 182 degrees C.)", is inclusive of the endpoints and all intermediate values of the ranges of "about 174 to about 182," etc.). "Mixture" is inclusive of blends, combinations, alloys, reaction products, and the like. Furthermore, the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the bearing(s) includes one or more bearings). Reference throughout the specification to "one embodiment", "another embodiment", or "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Figure 12:
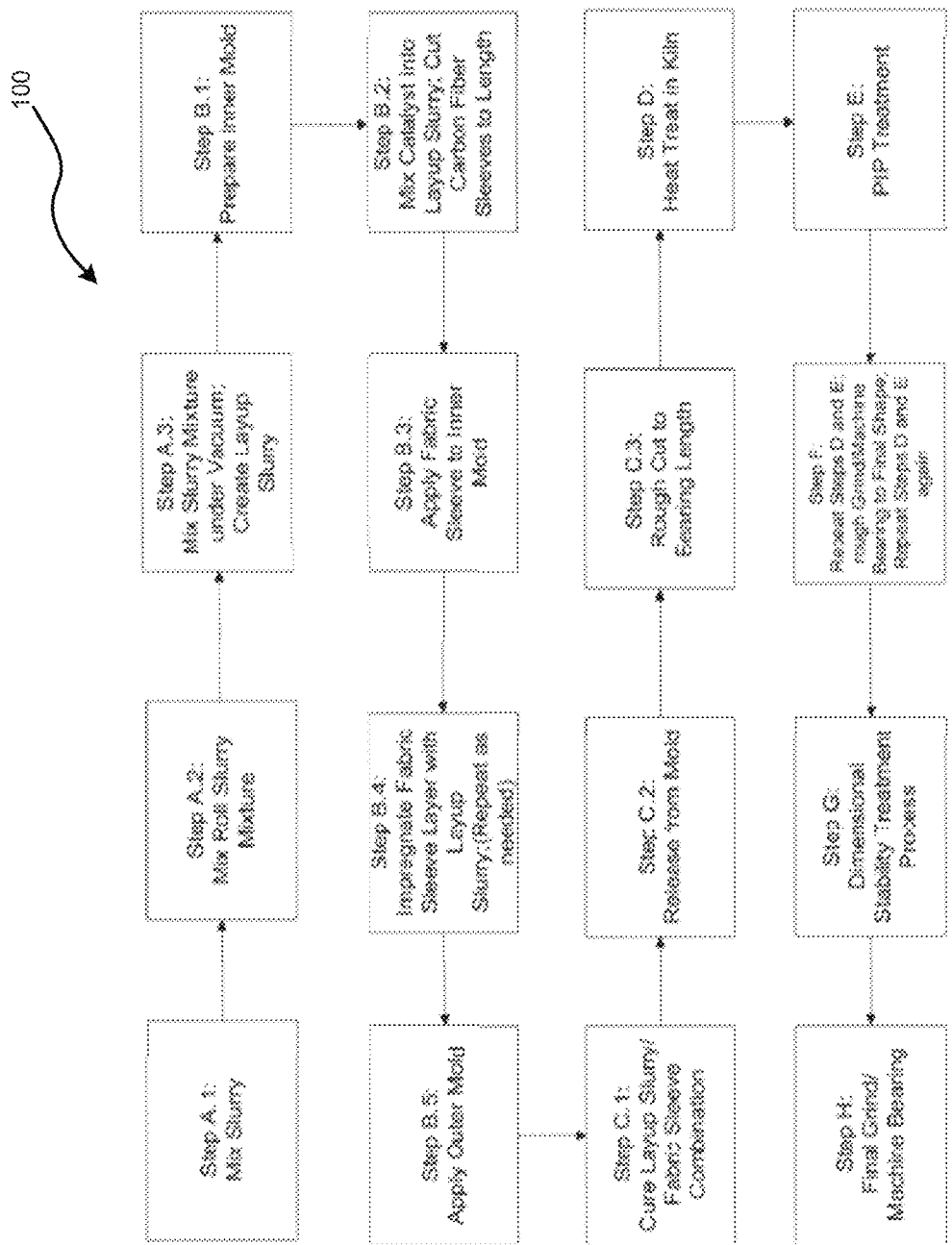
FIG. 12 is a block diagram of an exemplary method and process for making a ceramic composite bearing, such as the ceramic composite bearing shown in FIG. 1.
Figure 13:
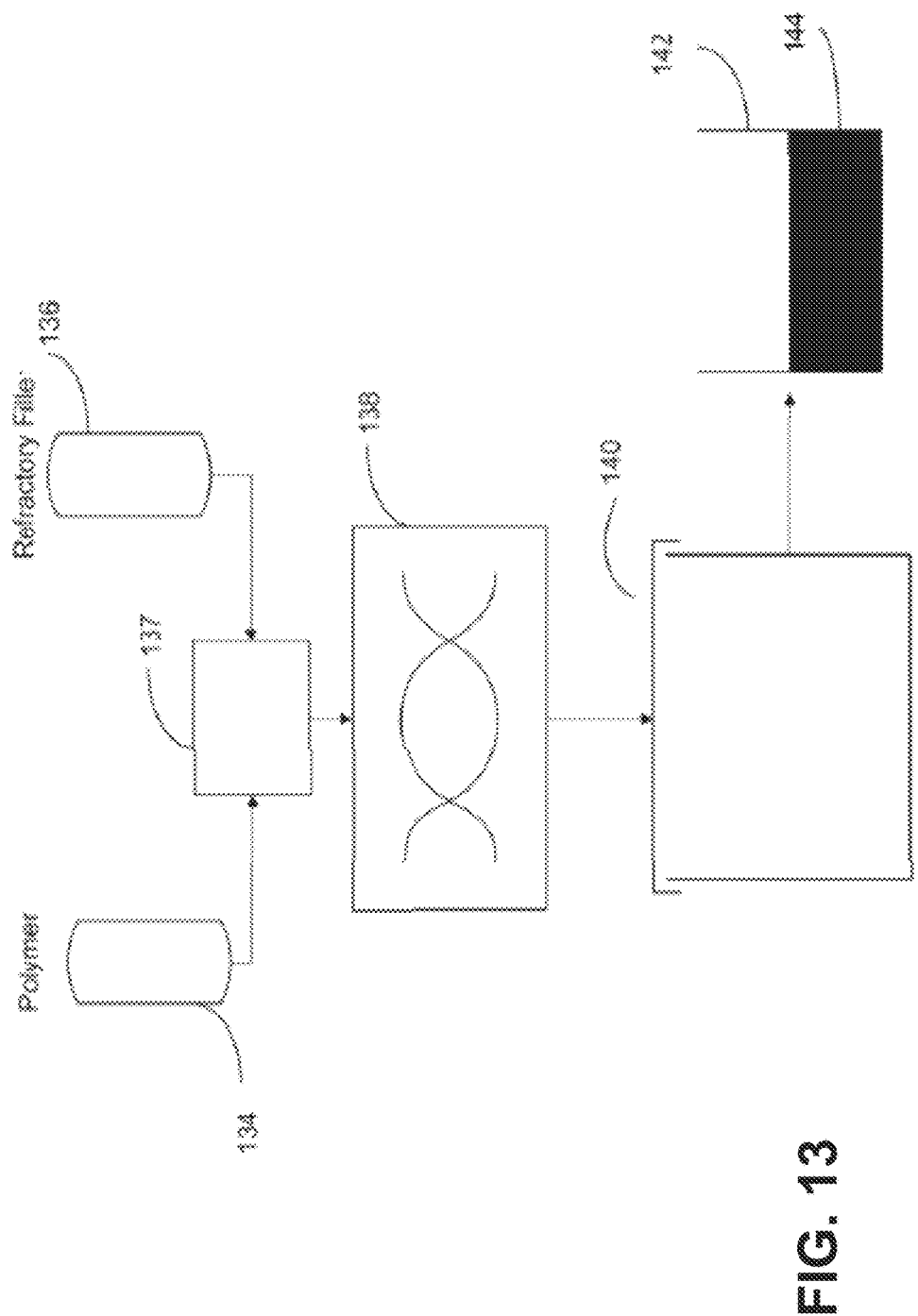
FIG. 13 is a flow chart of Step A of the exemplary method for creating a ceramic composite bearing shown in FIG. 12.
Figure 14:
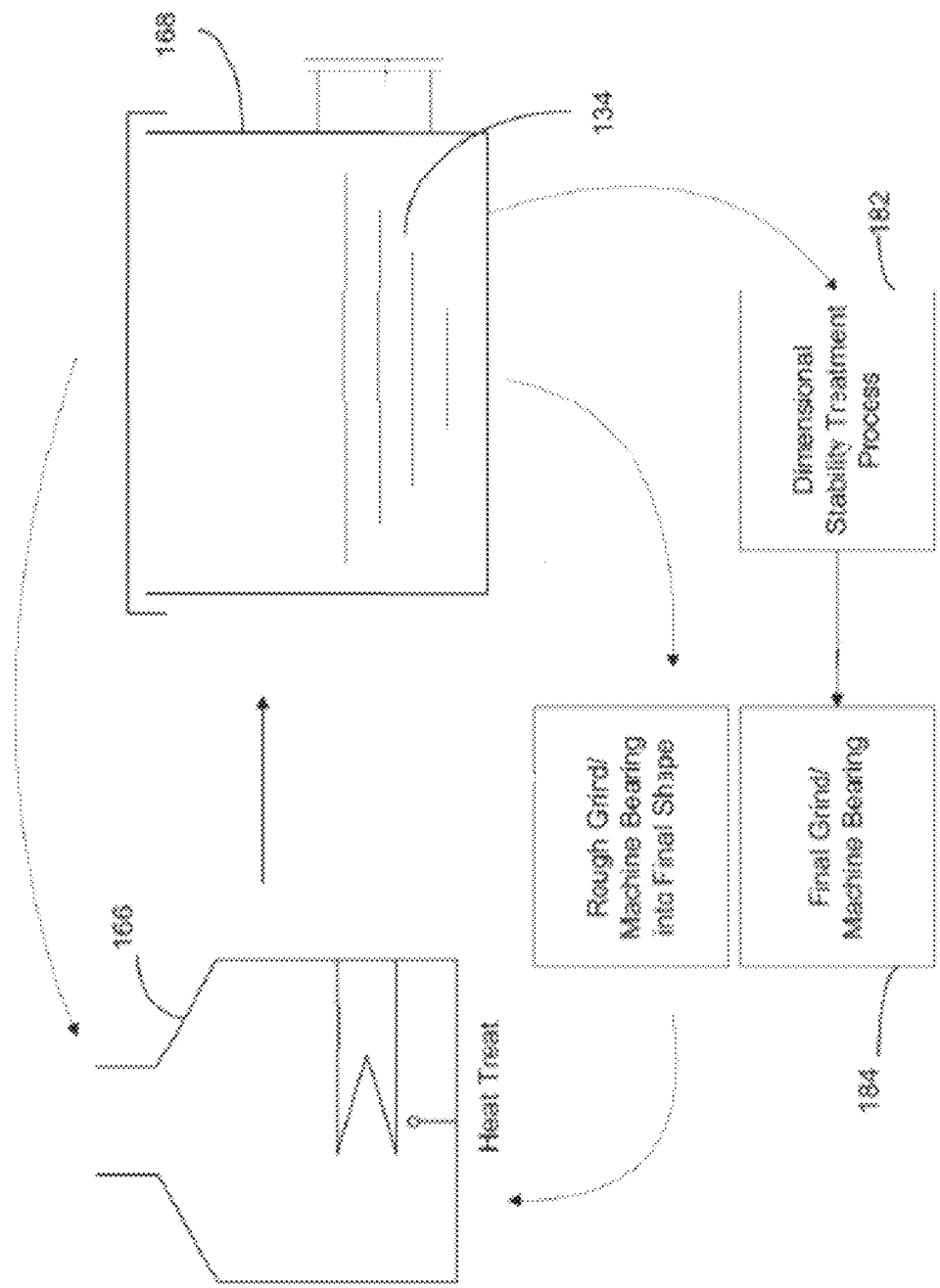
FIG. 14 is a flow chart of Steps D, E, F, G, and H of the exemplary method for creating a ceramic composite bearing.

Referring now to the drawings, like or similar elements are designated with identical reference numerals throughout the several views. FIGS. 12 through 14 provide schematic representation of an exemplary method 100 of making a ceramic matrix composite bearing in accordance with the present invention. FIGS. 1 through 11 each provide a representation of the ceramic matrix composite bearing (or its precursors) at one or more of the steps of FIGS. 12 through 14. The described embodiment of the method 100 is divided into steps that are then further divided into sub-steps and described in greater detail within the method and process.

Referring now to FIG. 12 and FIG. 1, a method 100 is generally shown for forming a ceramic matrix composite bearing 10 having enhanced strength and durability characteristics in a lightweight configuration. Such benefits are provided via aspects and features of method 100 including forming bearing 10 from a plurality of thermally bonded layers of fabric sleeves that are embedded and coated with a specialty slurry material as discussed below. As such, bearing 10 includes an elongated body 12 extending along a longitudinal axis 11 that includes integrated layers of reinforcing fabric material oriented in the same direction along the longitudinal axis 11 in combination with embedded/coated specialty materials, such as ceramic materials, ceramic composites and other materials, which provide much more robust bearing designs and configurations than monolithic configurations formed from the specialty materials alone.

These and other benefits and advantages can be further provided by steps that enhance properties of the bearing via method 100, like increasing the density of body 12 moving longitudinally outward, such as configuring bearing 10 to have greater density proximate its outer surface 13 in comparison with an inner surface 15 that forms an inner cavity 14 to configure bearing 10 to have a tubular arrangement. In addition, other aspects and features of method 100 discussed below can provide optional enhancing features for bearing 10, such as completely enclosing body 12 in a highly-penetrated, exceptionally-bonded coating of a polymer 25 that can further protect bearing 10 and enhance its improved features, such as providing even greater fracture resistance and deformation resistance via use of the enhanced polymer coating. Benefits and advantages can be provided based on properties from the configuration of specialty materials used to form the bearing body 12, as well as aspects and preferences for the related processing, such as the ease with which a specialty material slurry can embed a reinforcing fabric material, bond with other layers forming body 12, and cure to form body 12 as contiguous, unitary structure.

Referring now to FIGS. 12 and 13, A slurry mixture 144 is prepared in Step A, which can generally include three sub-steps A.1, A.2, A.3. In sub-step A.1, components are mixed together to form a slurry mixture. Then, in sub-steps A.2, A.3, the slurry mixture is further processed to make the slurry mixture fully homogenous and remove gasses.

More specifically and with continued reference to FIGS. 12 and 13, in the first sub-step A.1, the slurry mixture can be formed by combining pre-measured amounts of water, pre-ceramic polymer 134, and refractory filler 136 to form an initial slurry mixture. Examples of suitable pre-ceramic polymers 134 can include polysiloxanes polysilsesquioxanes, polycarbosiloxanes, polycarbosilanes, polysilylcarbodiimides, polysilsesquicarbodiimides, polysilsesquiazanes and polysilazanes. Examples of suitable refractory fillers 136 can include silicon carbide, zirconia, and alumina. The ratio of pre-ceramic polymer 134 to refractory filler 136 can depend upon the product being made and desired properties for the same, but will typically be in the range of 20-50% and, more preferably, in the range of 30-40%. The refractory filler 136 can be introduced into a container 137 holding the polymer 134 by stirring in small amounts of the refractory filler 136 until a relatively consistent slurry mixture is obtained.

The second sub-step A.2 comprises roll milling the initial slurry mixture. In the example embodiment illustrated in FIG. 13, a roll mill machine 138 comprising three rolls is used for this step. In such a configuration, the feed roller spacing for the slurry mixture as it enters the roll mill machine is preferably between 0.008 and 0.011 inches (0.203 to 0.279 mm), which can allow the slurry mixture to be fed relatively easily into the roll mill machine while providing initial gas removal/roll mixing processing. The exit roller spacing is preferably smaller than the feed roller spacing to provide a tapered arrangement that can provided greater gas removal and roll mix processing than what is provided via the feed rollers. In particular, the exit roller spacing can preferably be three to four thousandths of an inch less than the feed roller spacing, and more preferably can be between 0.005 and 0.007 inches (0.127 and 0.178 mm).

As such, the slurry mixture from sub-step A.1 in container 137 can be fed into the feed roller of the roll mill machine 138, during which it is mixed and rolled to exit having a reduced width thickness than at the feed roller entrance. The resulting mixture exiting the roll mill machine can be removed from roll mill machine 138 and then collected into a new clean container by cutting the mixture exiting the roll mill machine via, for example, a cutting instrument. In the embodiment shown in FIG. 13 having the configuration described above, the mill rolling sub-step A.2 is preferably performed multiple times, and more preferably is performed between two to eight times to thorough mix the slurry mixture and remove most gases from it.

The third sub-step A.3 of Step A can include, but is not limited to, mixing the slurry mixture in a vacuum mixing machine 140 to remove air and other gases that may remain in the pre-preg mixture after the roll mill processing of sub-step A.2. As such, the slurry mixture from step A.2 can be placed into the vacuum mixing machine receptacle. The vacuum mixing machine receptacle can be sealed to be airtight, and can be secured to vacuum mixing machine 140 for further mixing of the mixture in a reduced pressure environment, in which the pressure is preferably reduced to between $1 \times 10^{-2}$ to $1 \times 10^{-5}$ Torr. Thus, for sub-step A.3, the vacuum mixing machine 140 can be turned on and the mixture can be mixed utilizing the vacuum mixing machine 140 mixing operations that are performed under reduced pressure to provide enhanced removal of remaining gases. The vacuum mixing operations can preferably continue for a duration between 12 and 24 hours to thoroughly mix the mixture and remove most gases captured within the mixture. The resulting mixture is now called a layup slurry 144, which is more homogenous and less viscous than the initial slurry mixture. The layup slurry 144 is removed from the mixing machine receptacle and transferred to a dean container 142 to be used in subsequent steps.

Referring now to FIGS. 1-7 and 12, exemplary embodiments and configurations are generally shown for process steps and component configurations for Step B for forming a concentric stack of slurry-impregnated fabric sleeves over a rod-shaped inner mold. The exemplary embodiment shown in FIG. 12 and illustrated with related components in FIGS. 1-7 can generally include five sub-steps. The combination of these sub-steps for Step B can provide a fiber fabric base that is impregnated with the layup slurry, which can preferably be formed as a carbon fiber base impregnated with a ceramic composite layup slurry. Of course, it is understood that other fiber fabric bases and materials could be used, including, but not limited to ceramic fiber, glass fiber, quartz fiber and alumina fiber. The sub-step B.1 of Step B can include preparing an inner mold 20, which is preferably rod-shaped and has a tubular outer surface 21. As such, sub step B.1 can simply include positioning inner mold 20 in a manner to allow for the application of carbon fiber sleeves 16 and layup slurry 22, thereon.

The second sub-step B.2 preferably includes preparing the fiber fabric sleeves 16 and the layup slurry 22 for application in combination with the inner mold 20. Preferably, the fabric sleeves are prepared prior to preparing the layup slurry for application, so that the layup slurry can be applied shortly after it has been prepared and activated. Turning first to preparation of the fiber fabric sleeves, it is understood that the fiber fabric sleeves can be made from various fiber fabric materials including woven or interlaced fabrics made from ceramic fiber fabrics, glass fiber fabrics, quartz fiber fabrics and alumina fiber fabrics. Preferably, however, the fiber fabric sleeves are formed from carbon fiber sleeves 16, which can be prepared for use with process 100 according to user preferences, compatible with the layup slurry for particular configurations, and based on preferences for preparation steps and steps that may be available. For instance, preparation steps can include but are not limited to heat cleaning the fiber fabric sleeves 16, putting the fiber fabric sleeves 16 through a process of graphitization, firing them to be miscible with a polymer, and/or interfacing them with boron nitride. In addition to user preferences, some of these preparation steps may be less compatible with particular bearing uses, configurations and sleeve materials and/or they may be more or less available when performing method 100.

Figure 2:
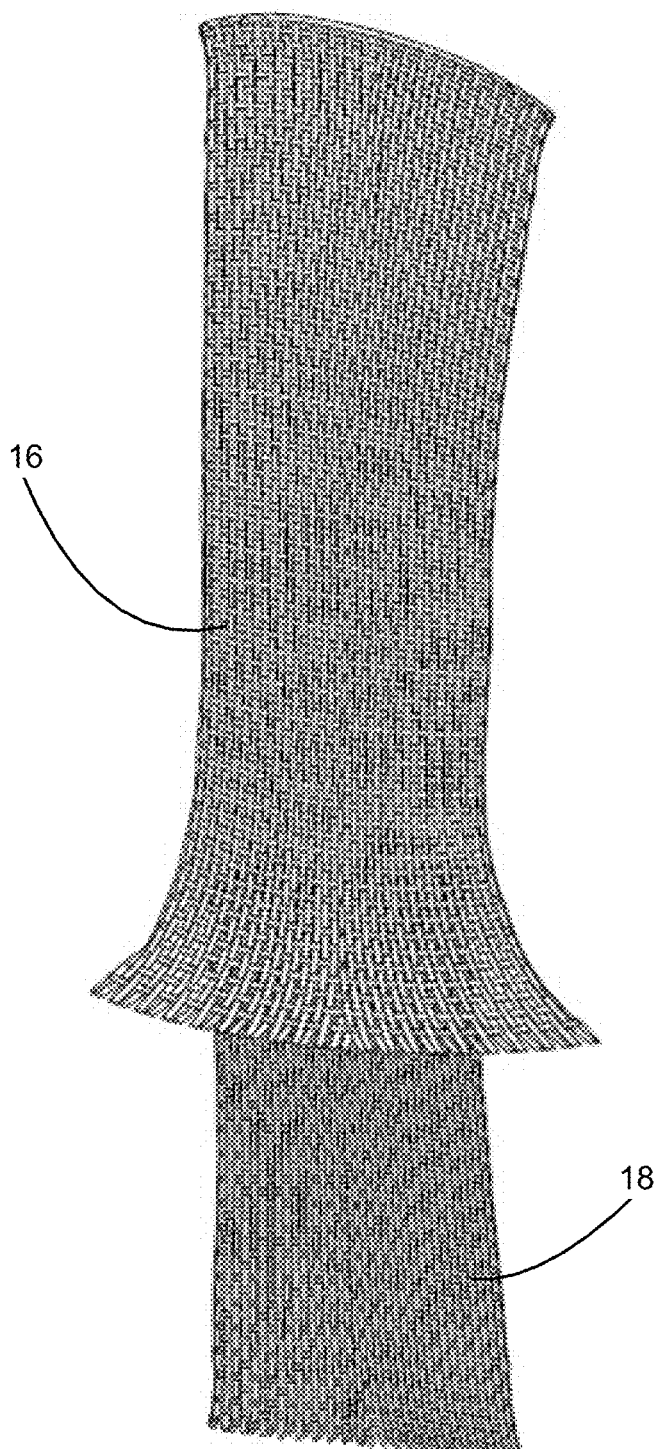
FIG. 2 is an elevation view of an exemplary fabric sleeve.
Figure 3:
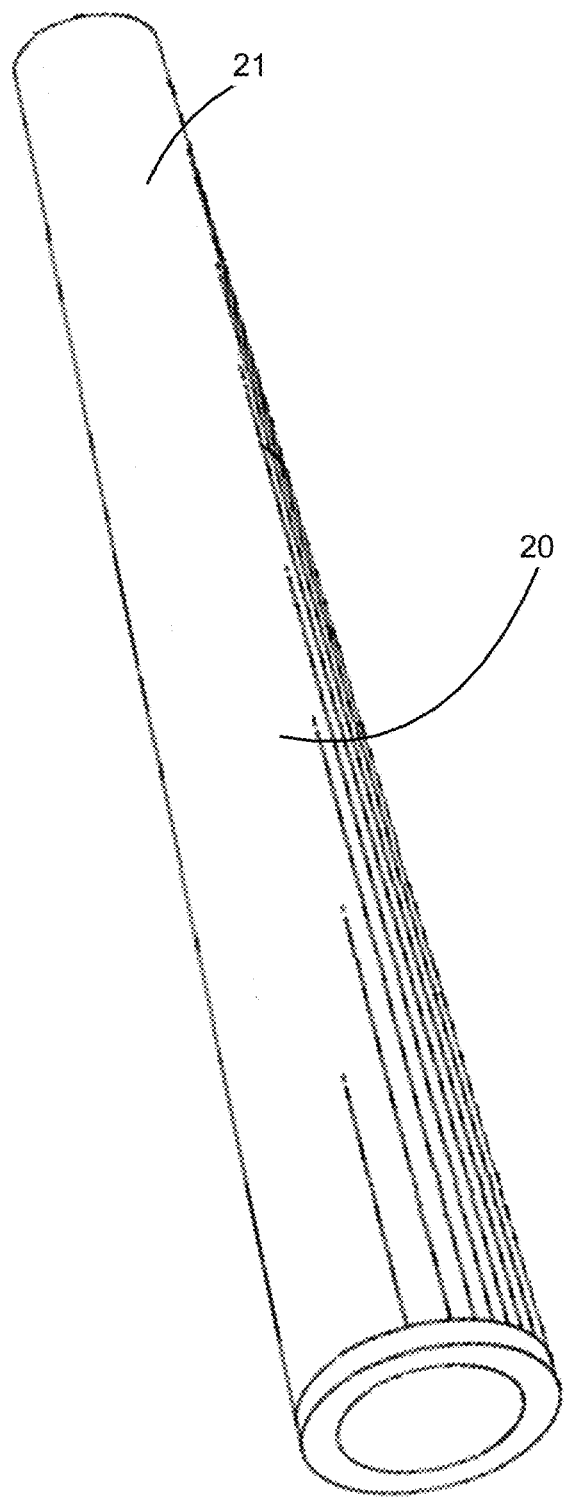
FIG. 3 is a perspective view of an exemplary inner mold.
Figure 4:
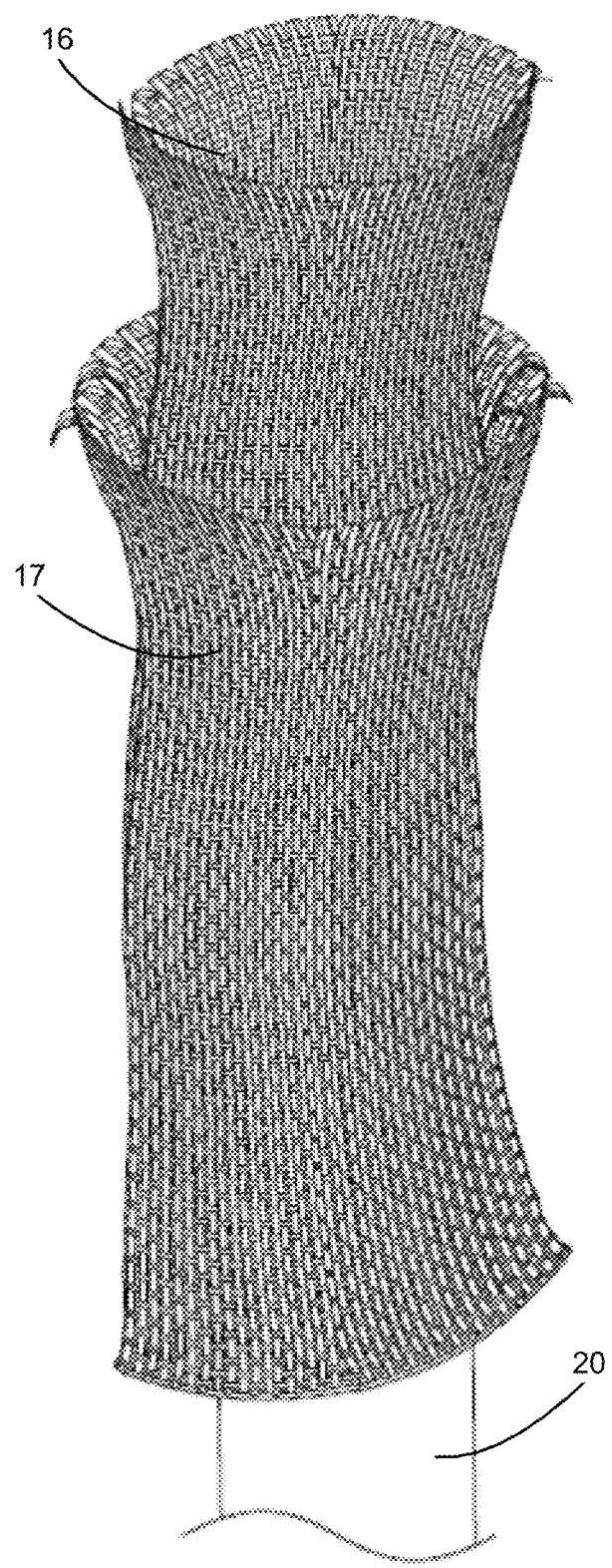
FIG. 4 is an elevation view of a stack of fabric sleeves of FIG. 2 placed concentrically over the inner mold of FIG. 3, which is shown with an innermost fabric sleeve extended from within the concentric stack for illustration purposes.

The fiber fabric sleeves 16 are preferably prepared for use with method 100 by forming the fiber fabric material into tubular configurations 18 as shown in FIG. 2, and thereafter cutting the tubular fiber fabric sleeves into lengths corresponding to the inner mold 20 and to pre-determined length requirement for the bearing. Thus, as shown in FIG. 2, fiber fabric can be obtained or formed in a tubular configuration 18 that is suitable for the diameter of the outer surface 13 of inner mold 20 and cut to a length that is suitable for particular bearing being made. The fiber fabric sleeve 16 can thus be formed as a cut-to-length tube 16 having a continuous fiber fabric perimeter extending around the tube sides and forming a pair of round openings at opposite ends of the tubule 20.

Preferably, a plurality of fiber fabric sleeves 16 are formed as a first part of sub step B.1 in order to provide a sufficient quantity of sleeves for forming a concentric stack of slurry-impregnated sleeves over inner mold 20 that matches a pre-determined mold assembly diameter parameter for the bearing being formed. After a sufficient number of fiber fabric sleeves 16 have been formed and prepared for use for the particular bearing requirements, they can be set aside temporarily while the second part of sub-step B.2 is performed to prepare the layup slurry to be applied along with the fiber fabric sleeves 16.

Sub step B.2 can continue with preparing the layup slurry 22 for use with the fiber fabric sleeves 16 by mixing a catalyst into the layup slurry 144 (created via Step A) to create an activated layup slurry 144a. Platinum-modified polycarbosiloxane is an example of a suitable catalyst. The ratio of the catalyst to the polymer in the layup slurry 144 is preferably in the range of about 1% to 5% by weight.

Preferably, an inhibitor is mixed into the layup slurry 144 at the same time as the catalyst (or mixed with the catalyst prior to being added to the layup slurry 144). The function of the inhibitor is to slow the catalytic reaction, which can make the layup slurry workable for a longer period of time and may improve the strength of the cured slurry. A methyl vinyl cyclic (MVC) addition-curable silicone known as ANDISIL MVC® has been found to be suitable for use with a platinum-modified polycarbosiloxane catalyst. The referred range of ratios of catalyst to inhibitor (by weight) is from 1:5 to 1:10, more preferrably from 1:8 to 1:10, and most preferably, 1:9.

Optionally, the activated layup slurry 144a can be heated. In other embodiments, the catalytic reaction between the polymer 134 and filler 136 could be stimulated by heat alone (i.e., without the addition of a chemical catalyst).

Preferably, the outer surface 21 of inner mold 20 is then coated with a thin layer of activated layup slurry 144a. Before applying this layer of activated layup slurry 144a, the inner mold 20 is preferably heated, a mold release agent is preferably applied to the outer surface 21, and the inner mold 20 is preferably heated a second time. Each of these heating steps is preferably to a temperature in excess of 150 degrees C., at which the inner mold 20 is held for at least 15 minutes.

Figure 5:
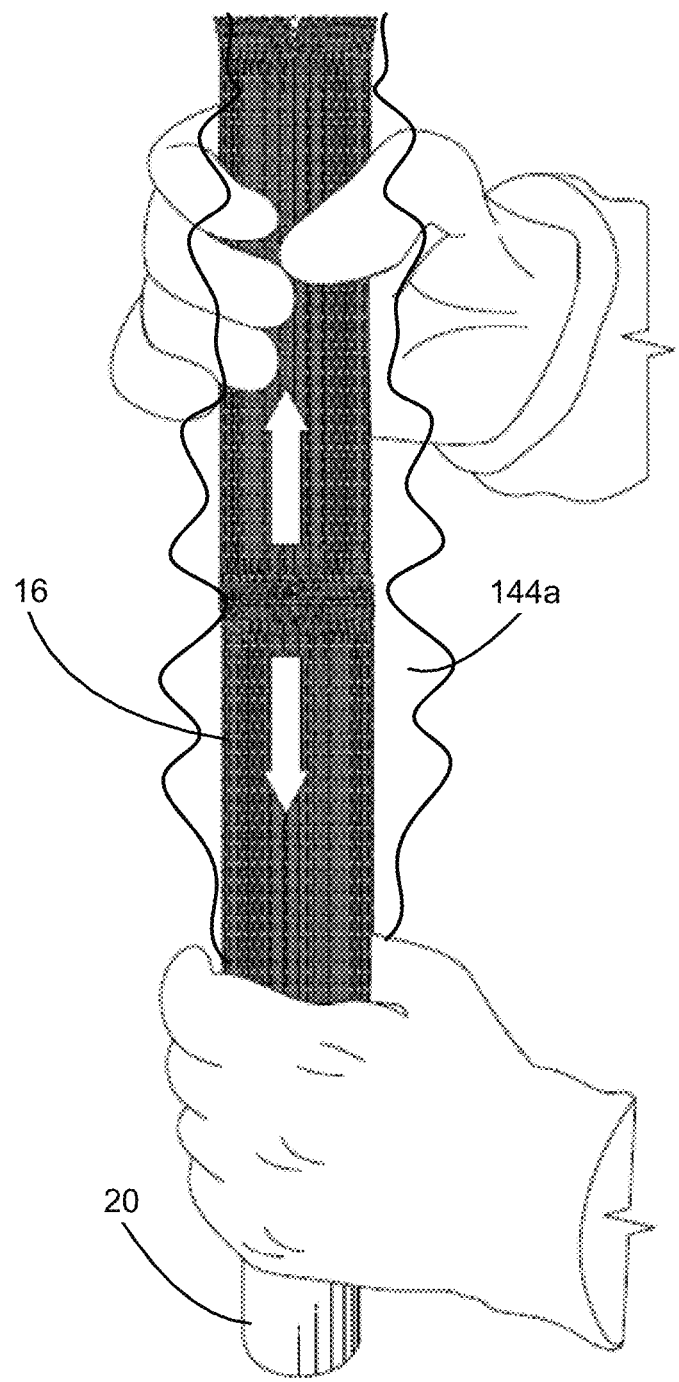
FIG. 5 is an elevation view of one or more of the fabric sleeves of FIG. 2 placed concentrically over the inner mold of FIG. 3 in an exemplary arrangement that can be used with a process for forming a ceramic composite bearing, which illustrates an exemplary process step of impregnating and coating a fabric sleeve with a ceramic composite slurry to form a slurry-impregnated sleeve layer.

Sub-step B.3 of Step B comprises placing a first carbon fiber fabric sleeve 16 longitudinally over the inner mold 20, its outer surface 21 (and, if provided, the layer of activated layup slurry 144a that has been applied to the outer surface 21. Preferably, the first fiber fabric sleeve 16 covers the entire length, or substantially the entire length, of inner mold 20. The lengths of the sleeves 17 added thereafter over the first fabric sleeve 16 can be shorter, but should be longer than the required length of the bearing being made including extending to at least one end of the inner mold 20. The next sub-step B.4 of Step B is the impregnation of the sleeve 16 by applying layup slurry evenly over the entire outer surface of the sleeve 16 as shown in FIG. 5.

Sub-steps B.3 and B.4 (concentrically stacking and slurry-impregnating each of the sleeves 16 over inner mold 20) is repeated until the desired number of layers 24 have been formed to provide a required outer diameter for the bearing in order to meet a "configuration" parameter for the bearing.

Figure 6:
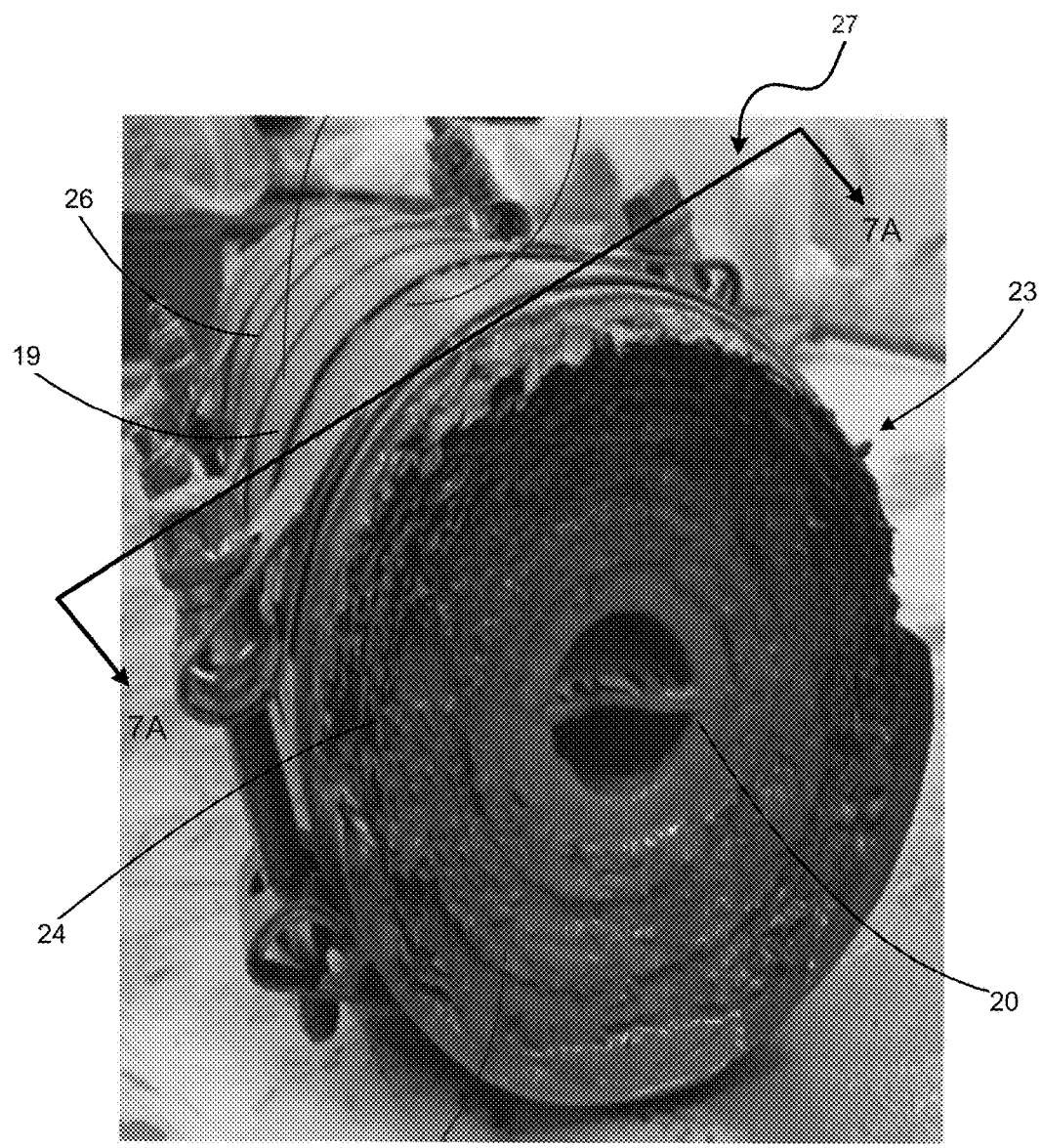
FIG. 6 is a perspective view of an exemplary mold assembly that can formed from a concentric stack of the sleeve layers that can be formed over the inner mold of FIG. 3 with respect to the exemplary process step of FIG. 5, which can include a cylindrical outer mold extending around the exterior of the assembly.
Figure 7A:
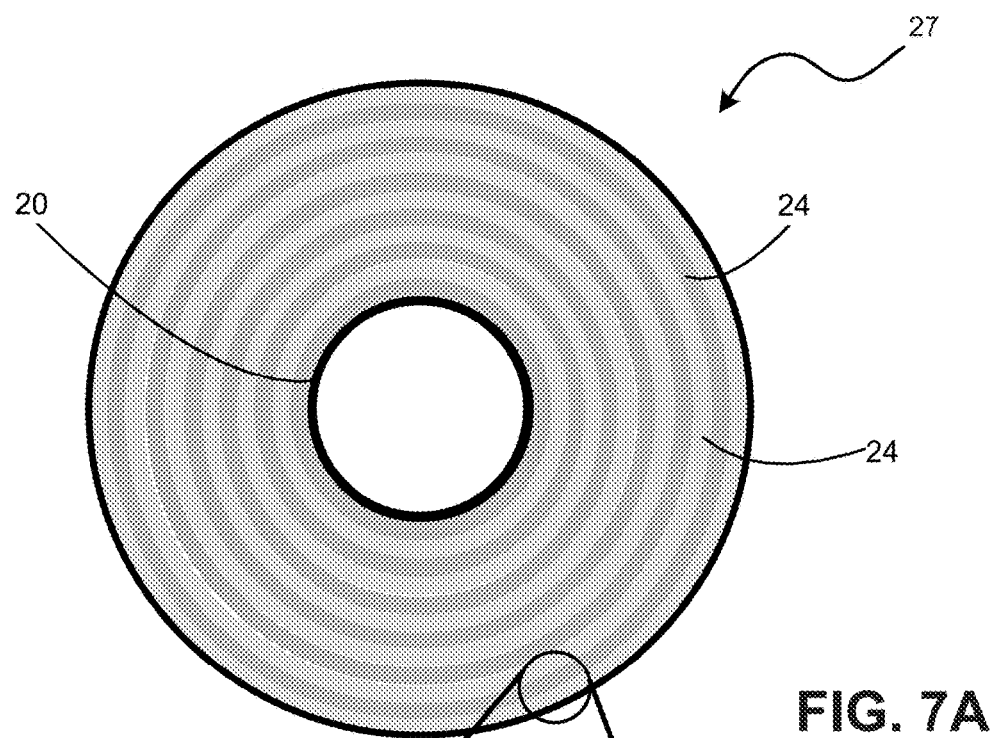
FIG. 7A is a cross-sectional view of an end portion of mold assembly of FIG. 6 (i.e., shown without the cylindrical mold)
Figure 7B:
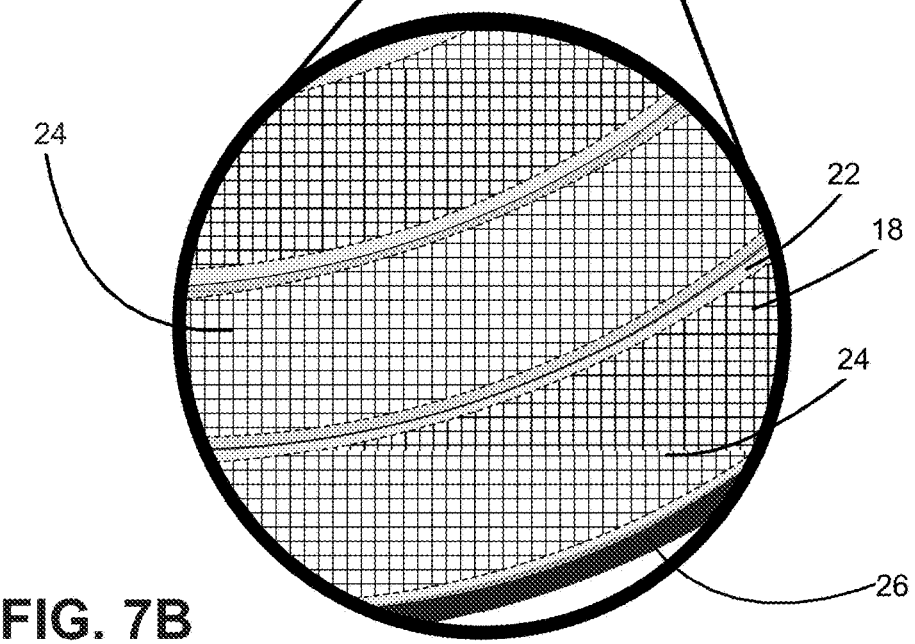
FIG. 7B is a close view of a portion of the concentric stack showing an exemplary arrangement of the fabric layers therein.
Figure 8:
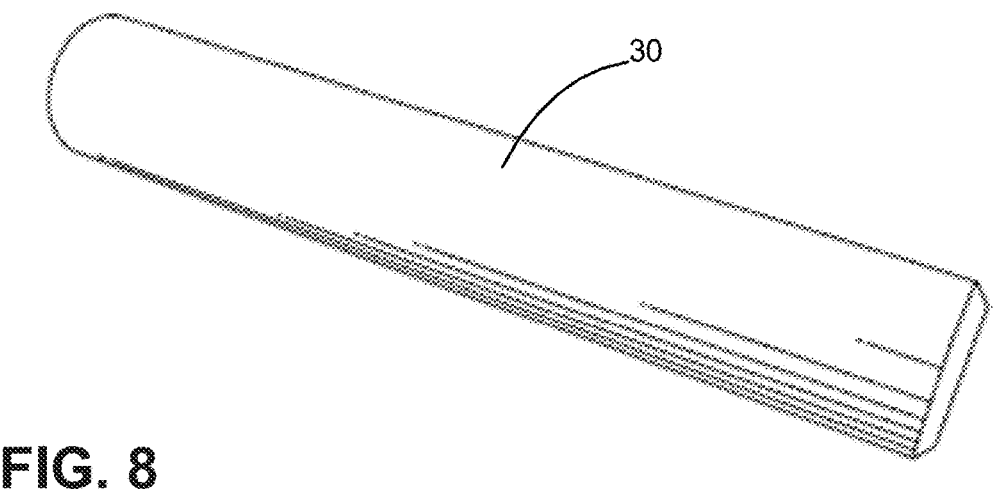
FIG. 8 is a perspective view of an exemplary green body formed according to the components and process steps shown in FIGS. 1-7B.
Figure 9:
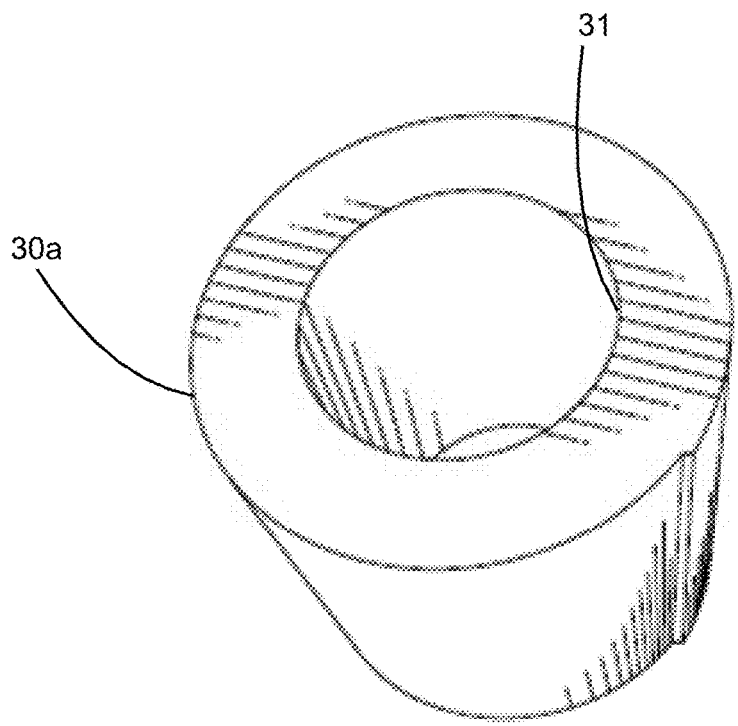
FIG. 9 is a perspective view of an exemplary green bearing, which is cut from the green body of FIG. 8.

The next sub-step B.5 of Step B comprises applying an outer mold 26, which can be formed as a die assembly and sleeve combination 26 as shown in FIG. 6. After achieving the desired layers 24 to meet the thickness configuration, the die assembly/sleeve 26 for the outer mold 26 is placed around and over the outer surface of the configuration so that it completely covers the layers 24 and the inner mold 20, and an inner surface of the outer mold 26 creates a cylindrical tube that surrounds the configuration. The outer mold 26 can then be secured by one or more clamps 19. In one embodiment, which is generally shown in FIG. 6, the outer mold 26 consists of an aluminum alloy die layered over a sheet metal sleeve. The clamps 19 used to secure the outer mold 26 in such an embodiment can include pipe clamps without being so limited, such that various types and designs of fasteners can be used. The combination of the inner mold 20, the layers 24 of slurry-impregnated fiber fabric sleeves 16, and the installed/clamped configuration of outer mold 26 thereon can be referred to hereinafter as the assembly 27.

Referring now to FIGS. 8, 9, 12 and 14, Step C generally includes three sub-steps. The first sub-step C.1 of Step C comprises heating the mold assembly 27 to bond together and cure the stack 23 of concentric slurry-impregnated fabric sleeve layers 24, thereby forming a tubular green body 30. This can be accomplished by placing the assembly 27 into an oven, such as a Tenny oven, and heating the assembly 27 at a pre-determined temperature and for a pre-determined period in order to bond together and cure the stack of concentric layers 24. The assembly 27 is preferably heated to 100 to 200 degrees C. for two and one half to three (2.5 to 3) hours. After heating the assembly 27 for the previously stated time, assembly 27 can be removed from the oven and allowed to cool until it is able to be comfortably handled using heat resistant gloves. The second sub-step C.2 of Step C comprises disassembling the molds of assembly 27 including removing the fasteners/clamps of the outer mold 26 and removing it from the assembly, as well as withdrawing the inner mold from bonded concentric stack 26 of layers 24 forming the central portion of the assembly 27.

The resulting cured concentric stack 23 of layers 24 can now be referred to as a "green body" 30. The third sub-step C.3 comprises cutting the green body to length. The green body 30 can be cut into rough lengths utilizing a band saw or similar cutting machine along with using an appropriate blade or cutting instrument, such as a diamond coated blade, to thereby form a green bearing 30A (see FIG. 9). A diamond coated blade or other high performance cutting instrument is required for cutting or machining the green body or green bearing due to the high strength and hardness of the cured assembly.

Referring to FIGS. 12 and 14, Step D comprises heat treating the green bearing 30A in a kiln. According to one embodiment, once the green bearing 30A has been placed into the kiln 166, the kiln settings can preferably be set to have a continuous flow of an inert gas (i.e. Nitrogen or Argon) of generally 20 to 25 cubic feet per hour (CFH), and the heat settings can be set to be in the range of heating at 0.5 to 2 degrees C. per minute to a temperature of at least 500 degrees C., and preferably in the range of 650 to 1600 degrees C., followed by a cool down at a rate of 0.5 to 2 degrees C. per minute. After the green bearing 30A has been run through the heat treating process, it can be allowed to cool to a workable temperature and removed from the kiln 166, when it becomes a heat-treated bearing. Any debris on the treated bearing resulting from the heat treating process is brushed off and the heat-treated bearing is cleaned in preparation for the next step of the process.

As further illustrated in FIGS. 12 and 14, Step E comprises a polymer infiltration and pyrolysis (PIP) treatment. The PIP treatment comprises placing the heat-treated bearing in a vacuum chamber 168, reducing pressure within the vacuum chamber 168 by a pre-determined PIP pressure reduction level, and maintaining the pre-determined PIP pressure reduction level in the vacuum chamber for a pre-determined PIP vacuum period ranging from 1 to 3 hours. A polymer 134 is then applied to the heat-treated bearing by submerging the heat-treated bearing in a container of the polymer 134 located within the PIP vacuum chamber 168, while maintaining the pre-determined PIP pressure reduction level. The heat-treated bearing is submerged in the polymer 134 while at the pre-determined PIP reduced pressure for a pre-determined polymer submersion period, which preferably ranges from 1 to 2 hours. At the end of the pre-determined polymer submersion period, the PIP chamber is returned to ambient pressure and the heat-treated bearing is removed from the PIP vacuum chamber 168. As shown in Step F, Steps D & E are preferably repeated at least twice.

Step F also preferably comprises rough machining the heat-treated bearing after performing steps D & E at least once and repeating Steps D & E at least twice (preferably at least five times) after rough machining. Rough machining is performed on at least some of the exposed surfaces of the green bearing 30A to dimension that is in a range of 0.02 to 0.10 inches of the specified final dimension for that exposed surface in the finished bearing. For example, if the specified dimension of an inner surface of the finished bearing has a diameter of 1.0 inches, the inner surface 31 of the green bearing could be rough machined to a diameter of 0.95 inches. The hardening effects of the heat treatment and polymer infiltration and pyrolysis (PIP) treatment steps described below have been found to be most effective at and near exposed surfaces of the bearing. Accordingly, rough machining the green bearing 30A provides increased hardness on the exposed surfaces of the final bearing than if rough machining were not performed.

After Step F, a dimensional stability treatment process 182 (Step G) is preferably performed on the heat-treated bearing. An exemplary dimensional stability treatment process 182 is shown in FIG. 14, which comprises submerging the heat-treated bearing in a water bath that has been preheated to at least 80 degrees C. and is under an elevated pressure of at least 172 kPa (25 PSI). The heat-treated bearing is preferably submerged for a pre-determined stability treatment period of at least 12 hours. Thereafter, the heat-treated bearing is removed from the heat/pressure vessel, and the dimensions of the bearing are measured, compared to applicable dimensional specifications, and a final grinding or machining 184 is performed (Step H) to bring the heat-treated bearing into the required final dimensional specifications.

Figure 10:
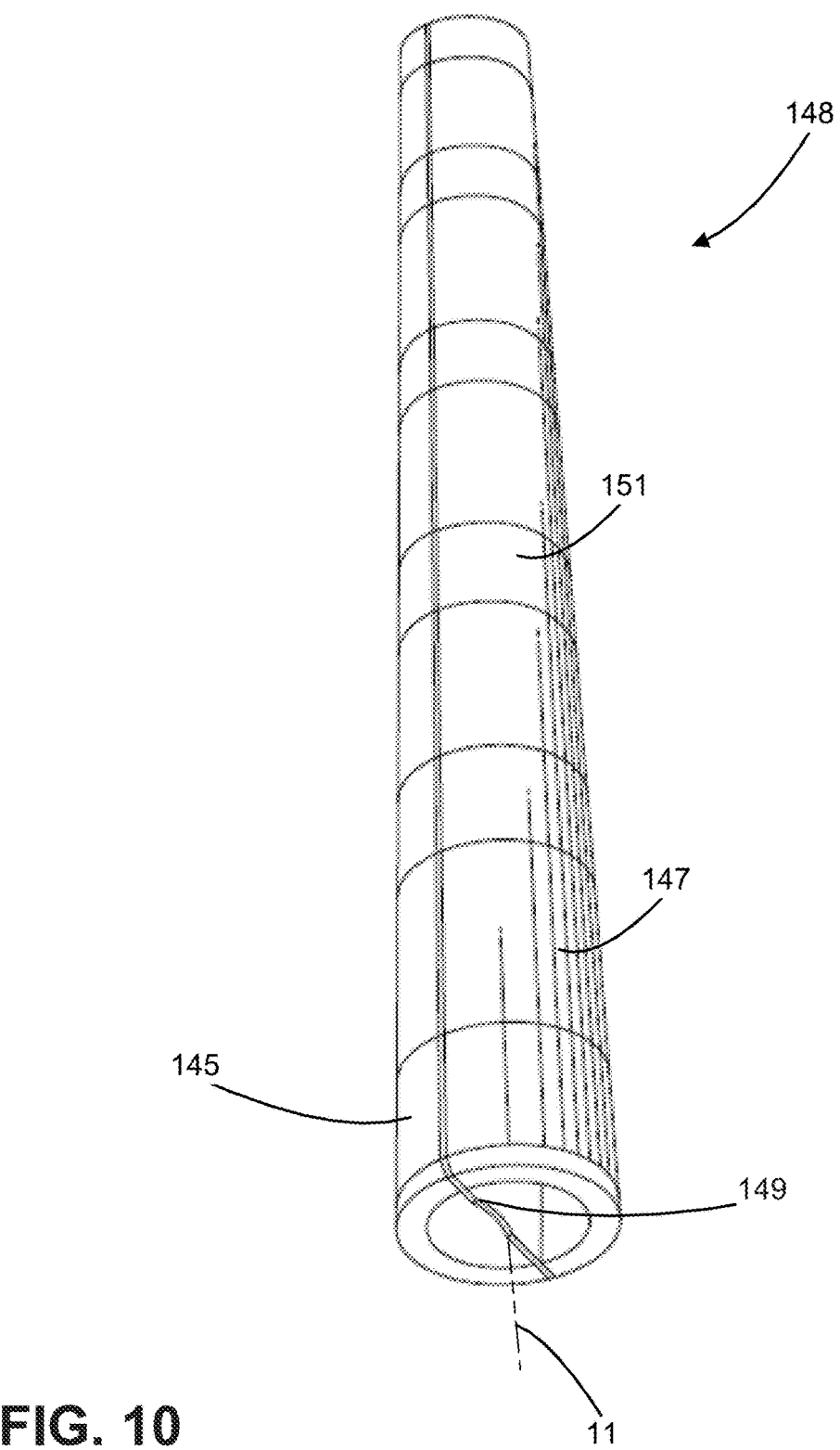
FIG. 10 is perspective view of a configuration of an exemplary expandable/collapsible inner mold that can be used to form the bearing as an alternative to the inner mold shown in FIG. 3.
Figure 11:
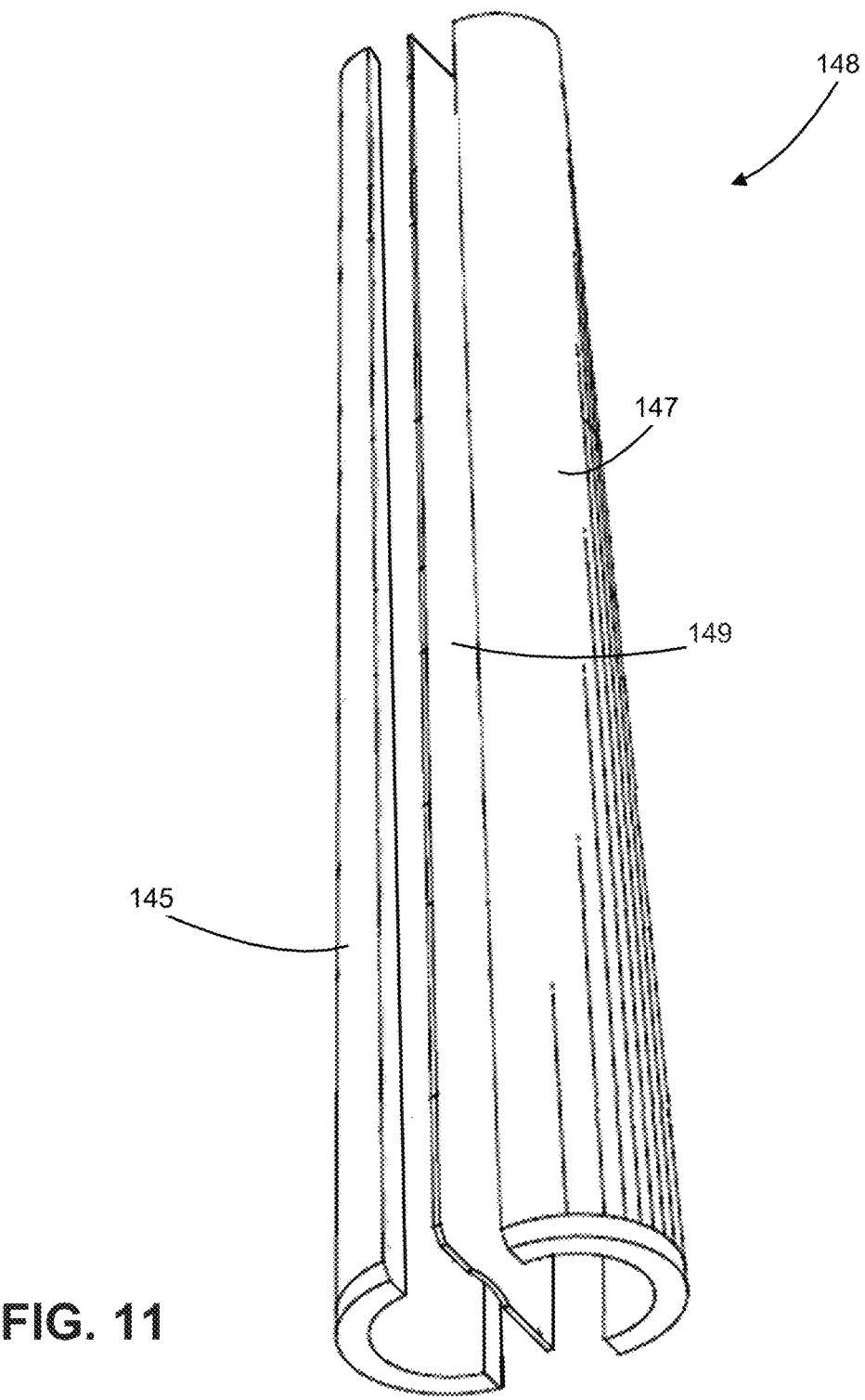
FIG. 11 is an expanded, perspective view of the inner mold of FIG. 10 showing mating halves that can form the inner mold along with a consumable material that can be disposed therebetween.

Referring now to FIGS. 10 and 11, another embodiment for an inner mold 148 is generally shown and described along with another embodiment for corresponding method steps using the same. As shown, inner mold 148 can include a pair of mating rod halves 145 and 147 that each include an opposing inner face oriented toward the other and extending the length of the rod halves in a direction parallel to longitudinal axis 11, such that when the rod halves 145, 147 face each other in a mating arrangement illustrated in FIG. 10, they form a rod-shaped inner mold 148 that has a gap formed between the mating halves 145, 147. As best seen in FIG. 11, a consumable material 149 can be placed within the gap in order to configure inner mold 148 as an expandable/collapsible inner mold arrangement. Such an arrangement can provide additional benefits and advantages for forming bearing 10 via method 100 including permitting even greater hardness and strength features for the bearing 10.

When using this alternative embodiment for inner mold 148, the concentric stack 23 of slurry-impregnated fiber fabric sleeves are sandwiched between the inner mold 148 and the outer mold 26 during sub-step B.5 when the outer mold is being applied. For Step C.1 using this embodiment, the inner mold 148 and outer mold 26 are then preferably heated to a range of between 175 to 188 degrees C. for preferably about 30 to 45 minutes. After heating, the inner mold 148 and outer mold 26 pieces are removed from the oven and a non-silicon containing mold release agent (e.g., a food grade Carnauba wax or other release agent) is preferably applied to the outer surface of the inner mold 148 and the inner surface of the outer mold 26. Once the mold release agent is applied to the inner and outer molds 148, 26 they are preferably heated again to between 175 to 188 degrees C. for about an additional 15 to 20 minutes. The molds are then allowed to cool to a temperature wherein they can be comfortably handled.

Once the pieces of the inner mold 148 are cool, a sheet of a high temperature-capable consumable material 149 is placed in between the two halves 145, 147 of the inner mold 148. The sheet of high temperature capable-consumable material 149 is preferably a minimum of 1.5 mm in thickness and cut to the length of the inner mold 148 and to the width of the outer diameter of the inner mold 148. The purpose of the high temperature capable consumable material 149 is to allow the halves 145, 147 of the inner mold 148 to, when removed during disassembly, to move closer together, which facilitates removal of the inner mold 148 in Step C.2. The elements of the inner mold 148 are assembled and secured together utilizing a fastener such as polyimide tape 151 shown in FIG. 10.

It should be noted that other alternative structures could be used for creating the inner mold 148, outer mold 26, and the assembly 27 in order to provide similar benefits as the expandable/collapsible design of split inner mold 148, Another alternative method for forming the inner mold can be to use an inflatable silicon bladder pulled into place over a metal tube and in a similar manner to the previously described means to form the inner tube 20. A non-silicon containing mold release agent (e.g., food grade Carnauba wax or similar substance) can be applied to the outer surface of the silicon bladder to assist with disassembly. The silicon bladder and metal tube alternative could be used in conjunction with performing the previously detailed above steps B.2 through B.5 in creating the assembly 27. The difference in utilizing the silicon bladder alternative is that after the outer mold 26 has been applied and the assembly has been constructed, the inner bladder can be inflated to thereby provide compression pressure from the inner dimension of the assembly 27 as opposed to what has been described above with the split inner mold 148, such that contraction and compression pressures can be conversely derived from tightening the fasteners around the outer mold 26. Another alternative variation for the inner mold 20 can include using a pipe expander to create the compression pressure from the inner dimension of the assembly 27. Other options and choices of techniques can also be employed and can be selected based on factors such as limitations on the allowable thickness of the bearing, the overall dimensions of the bearing, or even operator preferences.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof.

The invention claimed is:

1. A method for forming a ceramic matrix composite bearing, the method comprising:
    preparing a layup slurry formed from a mixture including water, a pre-ceramic polymer and a refractory filler, a ratio of the pre-ceramic polymer to the refractory filler being 20% to 50% by weight;
    forming a concentric stack of slurry-impregnated fabric sleeve layers over a rod-shaped inner mold;
    applying an outer mold that, when assembled, forms an inner perimeter in the shape of a tubular cylinder that extends around the concentric stack and the inner mold to form a mold assembly;
    heating the mold assembly to bond together and cure the stack of concentric slurry-impregnated fabric sleeve layers to form a tubular green body therefrom;
    rough cutting the green body to a pre-determined bearing length to form an elongate green bearing;
    rough treating the green bearing including iteratively performing a density-tuning process for one or more cycles until a density of the green bearing meets a pre-determined density parameter, the density-tuning process including performing, in order, steps comprising:
        heat-treating the green bearing in a kiln to create heat-treated bearing; and
        performing a polymer infiltration and pyrolysis treatment on the heat-treated bearing;
    conducting dimensional stability treatment processes on the heat-treated bearing; and
    performing final grinding and machining of the heat-treated bearing to meet pre-determined specifications.

2. The method of claim 1, wherein, for the step of preparing the layup slurry, the ratio is 30% to 40%.

3. The method of claim 1, wherein the step of preparing the layup slurry comprises:
    mixing a plurality of pre-measured slurry components including water and the ratio of the pre-ceramic polymer and the refractory filler to form a slurry mixture;
    roll-milling the slurry mixture through a roll mill machine having a plurality of feed rollers spaced apart at a pre-selected feed spacing and a plurality of exit rollers spaced apart at a pre-selected exit spacing including cutting a rolled mixture after exiting the machine;
    performing secondary roll-milling for one or more repeat cycles including roll-milling, as an entry material for the roll mill machine, the cut rolled mixture that exited the roll mill machine after the previous roll-milling cycle, and cutting a secondary rolled mixture exiting from the machine; and
    storing the layup slurry for use during subsequent processing.

4. The method of claim 3, wherein, for the step of performing secondary roll-milling, the one or more repeat cycles includes iteratively performing secondary roll-milling for one to seven repeat cycles after the step of roll-milling the slurry mixture through the roll mill machine, so that the slurry mixture is roll-milled through the roll mill machine 2 to 8 times.

5. The method of claim 3, wherein the step of preparing a layup slurry further comprises:
    after completion of the repeat cycles, mixing the secondary cut rolled exit mixture for a vacuum mixing period within a vacuum mixing machine while pressure within the vacuum mixing machine is reduced by a pre-determined pressure reduction to form the layup slurry.

6. The method of claim 5, wherein, for the step of mixing the secondary cut rolled exit mixture for the vacuum mixing period within the vacuum-mixing machine, the vacuum mixing period is from 12 to 24 hours and the pre-determined pressure reduction is a reduction of at least $1 \times 10^{-2}$ Torr.

7. The method of claim 1, wherein the step of forming the concentric stack of slurry-impregnated fabric sleeve layers over the rod-shaped inner mold comprises:
    providing a plurality of tubular-shaped fabric sleeves formed from a fiber fabric, each one of the fabric sleeves being formed into a tube having a continuous wall perimeter formed into an elongate loop and forming a pair of openings at opposite ends of the loop;
    coating an outer surface of the inner mold with a first portion of the layup slurry; and
    concentrically stacking and slurry-impregnating the plurality of fabric sleeves including repeating, in order, a stacking cycle to concentrically add each of the plurality of fabric sleeves to the concentric stack until a pre-determined stack configuration has been achieved, the stacking cycle comprising:
        positioning one of the plurality of fabric sleeves longitudinally over the coated inner mold and the stack of installed concentric slurry-impregnated fabric sleeve layers disposed thereon, if any; and
        impregnating and coating the one of the plurality of fabric sleeves with a second portion of the layup slurry.

8. The method of claim 7, wherein the fabric sleeves comprise a woven ceramic fiber fabric.

9. The method of claim 7, further comprising, immediately prior to performing the step of coating the outer surface of the inner mold, mixing into the layup slurry a pre-determined ratio of a catalyst, the pre-determined ratio being a being based on the weight of the pre-ceramic polymer previously mixed into the layup slurry.

10. The method of claim 9, wherein the pre-determined ratio of the catalyst is a ratio from about 1% to 5% by weight of the catalyst to the pre-ceramic polymer previously mixed into the layup slurry.

11. The method of claim 9, wherein the catalyst comprises platinum-modified polycarbosiloxane.

12. The method of claim 9, wherein the catalyst comprises a methyl vinyl cyclic (MVC) addition-curable silicone.

13. The method of claim 7, wherein, for the step of forming the concentric stack, the sub-step of impregnating and coating the one of the plurality of fabric sleeves with the second portion of the layup slurry further comprises:

coating side portions of the one of the plurality of fabric sleeves with the second portion of the layup slurry; and ensuring a coating of layup slurry extends from each of the side portions to a corresponding side of the inner mold.

14. The method of claim 7, wherein, before forming the concentric stack performing on each of the fabric sleeves at least one of the steps selected from the group of heat cleaning, firing with binders configured to provide miscibility with polymers, and interfacing with boron nitride.

15. The method of claim 7, wherein the step of providing the plurality of fabric sleeves includes performing one or more preparation processes on the fabric sleeves including graphitization processing.

16. The method of claim 7, wherein:

for the step of forming the concentric stack, the rod-shaped inner mold is formed from an outwardly expandable-collapsible rod-shaped inner mold;

the step of forming the concentric stack of slurry-impregnated fabric sleeve layers over the rod-shaped inner mold comprises outwardly expanding the rod-shaped inner mold; and the method further comprises, after heating the mold assembly to bond together and cure the concentric stack, performing the step of disassembling the mold assembly including:

removing the outer mold;

collapsing the rod-shaped inner mold; and withdrawing the collapsed inner mold from a central portion of the green body.

17. The method of claim 16, wherein:

for the step of forming the concentric stack, the rod-shaped inner mold is formed from a rod-shaped inner mold configuration selected from the group consisting of:

a pair of mating rod halves that each include a contact surface opposed to the contact surface of the other mating rod half and extending parallel with a longitudinal axis of the rod-shape inner mold and forming an interface therebetween, a consumable material being installed and removed between the pair of the mating rod halves in the interface to expand and collapse the rod-shaped inner mold;

an inflatable silicon bladder pulled over a metal tube and configured to expand when inflated and collapsing when not inflated; and a tubular pipe expander configured to selectively expand and collapse the rod-shaped inner tube.

18. The method of claim 1, wherein for the step of rough treating the green bearing, the sub-step of performing the PIP treatment on the heat-treated bearing comprises:

placing the heat-treated bearing in a vacuum chamber;

reducing pressure within the vacuum chamber by a pre-determined PIP pressure reduction level;

maintaining the pre-determined PIP pressure reduction level in the vacuum chamber for a pre-determined PIP vacuum period ranging from 1 to 3 hours;

submerging the heat-treated bearing in a polymer while within the PIP vacuum chamber at the pre-determined PIP pressure reduction level;

maintaining the heat-treated bearing submerged in the polymer while at the pre-determined PIP reduced pressure for a pre-determined polymer submersion period ranging from 1 to 2 hours;

after the pre-determined polymer submersion period, returning the PIP chamber to an ambient pressure level; and removing the heat-treated bearing from the PIP vacuum chamber.

19. The method of claim 1, wherein the step of conducting dimensional stability treatment processes on the heat-treated bearing comprises:

submerging the heat treated bearing in a water bath that has been pre-heated to at least 80 degrees C. and under an elevated pressure of at least 172 kPa (25 PSI) for a pre-determined stability treatment period.

20. The method of claim 19, wherein the stability treatment period is a period of at least 12 hours.

* * * * *